No. 627,017. Patented June 13, 1899.
F. C. SIXT.
PLATEN PRINTING PRESS.
(Application filed Jan. 9, 1899.)
(No Model.)
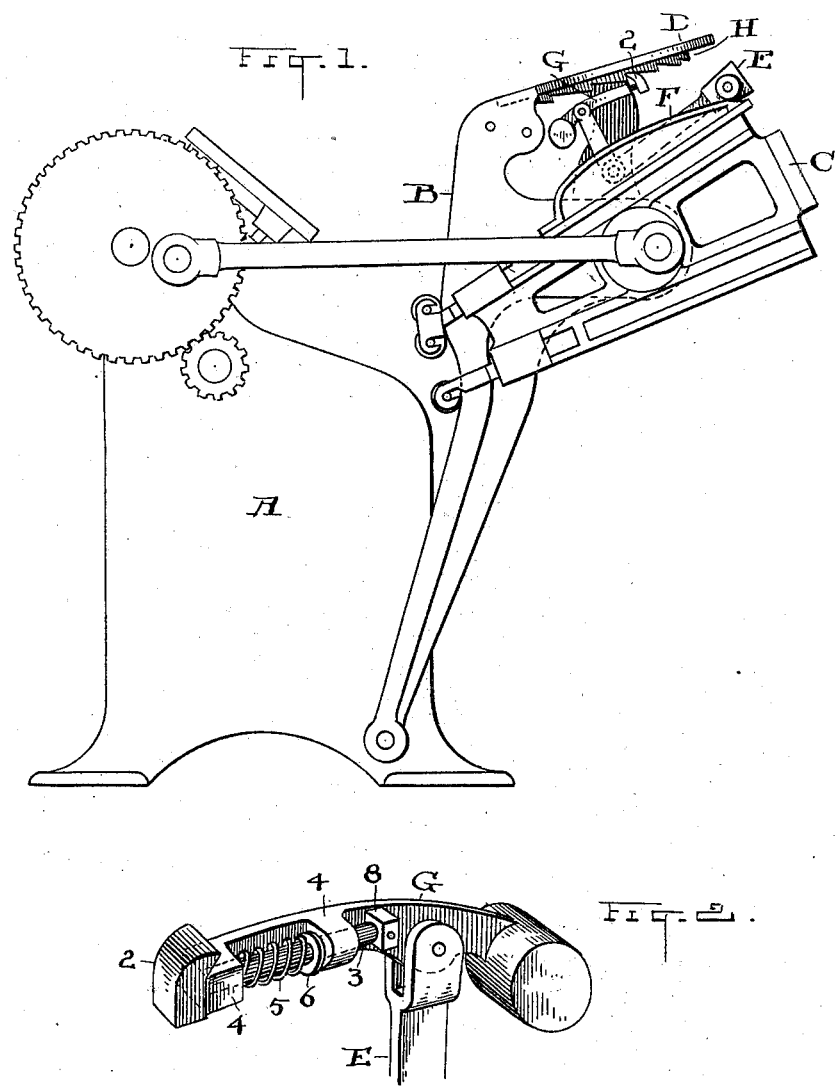

UNITED STATES PATENT OFFICE.

FREDRICK C. SIXT, OF CLEVELAND, OHIO, ASSIGNOR TO THE CHANDLER & PRICE COMPANY, OF SAME PLACE.

PLATEN PRINTING-PRESS.

SPECIFICATION forming part of Letters Patent No. 627,017, dated June 13, 1899.

Application filed January 9, 1899. Serial No. 701,557. (No model.)

*To all whom it may concern:*

Be it known that I, FREDRICK C. SIXT, a citizen of the United States, residing at Cleveland, in the county of Cuyahoga and State of Ohio, have invented certain new and useful Improvements in Platen Printing-Presses; and I declare that the following is a full, clear, and exact description of the invention, which will enable others skilled in the art to which it appertains to make and use the same.

My invention relates to improvements in platen printing-presses; and the object of the invention is to reduce the noise produced in the old construction when the dog engages the teeth on the inking-disk.

To this end the invention consists in the construction, combination, and arrangement of parts, substantially as shown and described, and particularly pointed out in the claims.

In the accompanying drawings, Figure 1 is a side elevation of a printing-press in which the dog above referred to is shown in actuating engagement with the ratchet on the bottom of the inking-disk. Fig. 2 is an enlarged detail view of the new construction of pawl or dog in reverse position to that seen in Fig. 1 and closed instead of open as in said figure.

The various prominent parts of the press—such as the main frame A, bed B, the oscillating frame C, inking-disk D, and so on—are old and well known and serve no other purpose in this case but to present the invention in its practical and working relation.

E is the usual crank-arm or rigid elbow, adapted in this instance to run on the cam F, which naturally promotes quiet working of the parts, and carrying on its inner extremity the dog or ratchet G pivoted thereon.

It is exceedingly desirable to have a quiet operating printing-press, and everything that contributes to this end is welcomed by both the builders and the users of presses. Even if the noise be comparatively slight in a single machine it may become exceedingly objectionable when it is multiplied by a number of machines running together at the same time. Hence the present invention. In weighted dogs or pawls as heretofore used there always has been a very distinct and decided click as the dog engaged any one of the circular series of ratchet-teeth H on the bottom of the ink-disk, and being a noise it was of course objectionable, particularly as it always had a clinking metallic sound noticeable a considerable distance away from the press. I therefore conceived the idea embodied in the present invention for deadening the sound of the contact by cushioning the engagement. To this end the head 2 of the dog is made independent of the arm G and supported on the spindle 3, which in turn is supported in the lugs 4 on the side of the arm. A spiral spring 5 encircles the spindle 3 between said lugs, and at one end bears against the collar 6 and at the other against the lug nearest the dog 2. Outside the inner lug on the extremity of the spindle 3 is a square stop 8 to limit the pull on the spindle when the dog 2 engages and to keep the head and spindle from turning. This affords a spring-cushioned dog which so materially deadens the contacting noise the dog has heretofore made that the present operation is practically noiseless.

What I claim is—

1. In a printing-press, an inking-disk having a circular ratchet on its under side, in combination with a pawl to engage the ratchet having a separate engaging head, a spring to cushion the engagement, and a rocking member on which the pawl is pivoted, substantially as described.

2. The construction substantially as described consisting of the inking-disk and the ratchet to actuate the same, in combination with the rocking elbow and a pawl pivoted thereon and having a spring-cushioned separate head, substantially as described.

3. The pawl substantially as described, having an arm and a separate engaging head provided with a spindle supported on said arm and a spring to deaden the sound of contact of said head, in combination with the inking-disk and its ratchet and the pivoted elbow carrying said pawl, substantially as described.

Witness my hand to the foregoing specification this 13th day of December, 1898.

FREDRICK C. SIXT.

Witnesses:
H. E. MUDRA,
R. B. MOSER.